March 3, 1964
R. F. RASMUSSEN
3,122,972
HYDRAULIC SERVOMOTOR
Filed Dec. 16, 1960
2 Sheets-Sheet 1
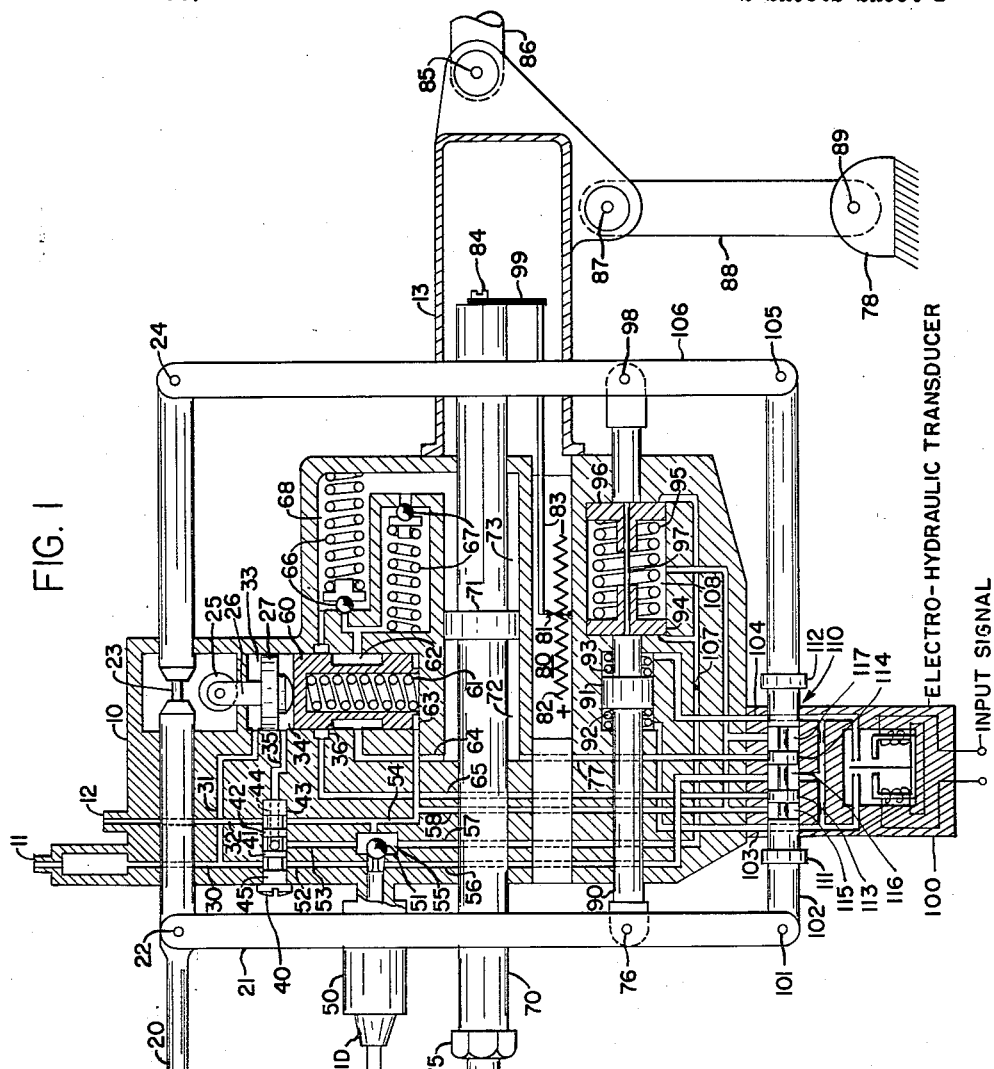
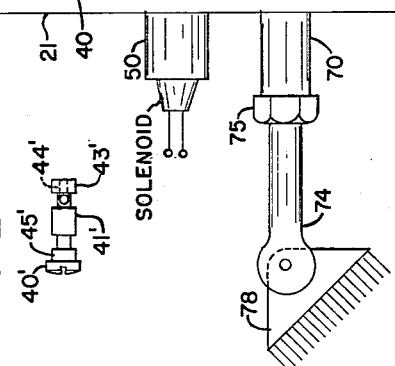
INVENTOR
ROBERT F. RASMUSSEN
BY
ATTORNEY

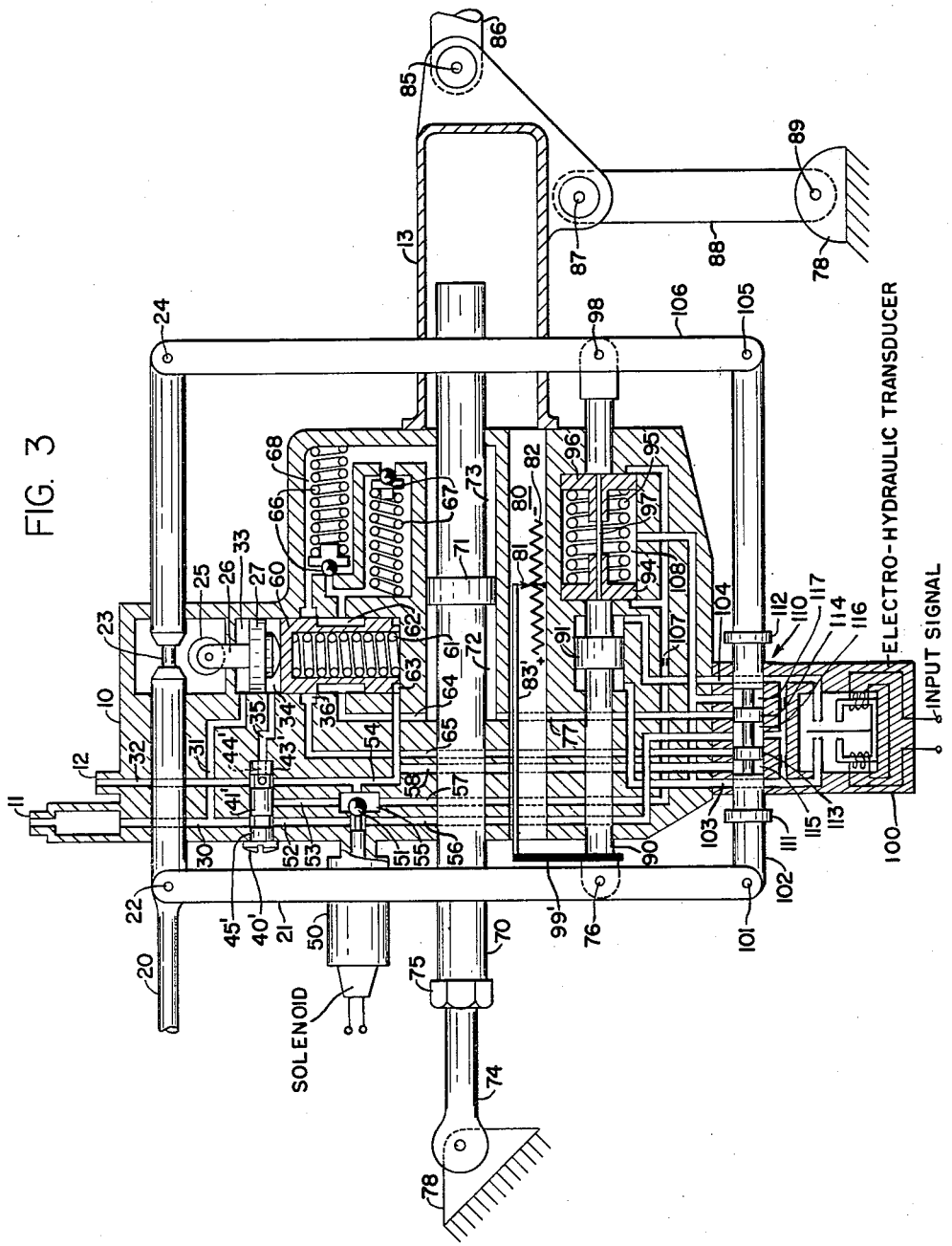

United States Patent Office 3,122,972
Patented Mar. 3, 1964

3,122,972
HYDRAULIC SERVOMOTOR
Robert F. Rasmussen, Brooklyn Center, Minn., assignor to Minneapolis-Honeywell Regulator Company, Minneapolis, Minn., a corporation of Delaware
Filed Dec. 16, 1960, Ser. No. 76,313
6 Claims. (Cl. 91—216)

This invention relates to a hydraulic servomotor of the sort comprising a servomotor housing movable relative to the main actuator, under the influence of a pressure medium such as oil, and positioned by a combination of manual and electrical input signals. Servomotors of this sort are often encountered in control and regulation applications, where they are used for amplifying the force from an electro-magnetically operated control device so that valves or the like may be operated therefrom.

More particularly, this invention relates to a compact servomotor capable of converting either or both electrical and mechanical inputs of substantially different orders of magnitude into an amplified hydraulic output.

In aircraft flight control systems, it has become the usual practice to provide an electromechanical servomotor, frequently hydraulically controlled, which will respond to both mechanical and electrical input signals, either individually or in combination. The electrical signals are ordinarily received from an automatic flight control system, more frequently called an autopilot, and the mechanical input signals are ordinarily received from the manual control lever. The actual configuration of the servomotor may be such that a series or a parallel operation is achieved.

Parallel operation is the term used to refer to a system wherein the electrical signals alone are effective to control the output shaft. However, in a parallel system, any movement of the output shaft caused by the electrical input is reflected, through the appropriate linkages, to the manual control device; so that, in an airplane application, the pilot would feel the control surface movements in his control stick. The parallel servomotor configuration is conventionally used in the parallel autopilot mode of operation which is commonly known as the "autopilot" mode of operation.

Series operation is the term used to refer to a system wherein electrical and mechanical signals are simultaneously effective to control the output shaft. However, the electrical signals are incapable of causing movement of the manual control lever. Thus, in a series system, the manual control device, such as the control stick in an aircraft, is not moved responsive to the electrical, or autopilot, signals, so that minor corrections of the aircraft flight characteristics can be achieved without causing a continuous "stick feel." The series servomotor configuration is conventionally used in the series autopilot mode of operation which is commonly known as the "damper" mode of operation.

It should be pointed out that it is common to find both series and parallel configurations of servomotors in a conventional automatic flight control system. Where both configurations of servomotors are used, it has become a problem, insofar as the cost is concerned, to stock and supply two entirely independent types of servomotors. It is generally agreed in the industry that it is much more practical to supply a single servomotor that can be quickly and conveniently modified to serve either function. The instant invention solves this problem in a very simple and straight-forward manner, and permits the use of a single servomotor which can be used for both series and parallel operation.

Therefore, it is an object of this invention to provide an improved hydraulic servomotor.

Another object of this invention is to provide a servomotor of the type described that can be conveniently altered to operate either as a series or as a parallel servomotor.

The features of this invention which are believed to be novel are set forth with particularity in the appended claims. The invention itself, however, may best be understood by reference to the following description and the accompanying drawings, in which:

FIGURE 1 is a vertical section view of the servomotor which somewhat schematically illustrates the servomotor in the parallel operation configuration;

FIGURE 2 is a side view of the alternate plug which is required for series operation; and FIGURE 3 is a vertical section view of the servomotor which somewhat schematically illustrates the servomotor in the series operation configuration.

The overall operation of this system will be best understood from the drawings and by the realization that the manual control device, such as the pilot's control stick, is connected to shaft 20 in such a manner as to cause the longitudinal movement thereof. The electrical signals are received in the transducer or electrical input means 100, wherein the electrical signals of one polarity are effective to cause an increase in pressure in the fluid passage 103 so as to cause movement of the output arm 86 in one direction, in a manner to be described below. Signals of the opposite polarity are effective to cause an increase in pressure in the fluid passage 104 so as to cause movement of the output arm 86 in the opposite direction. Transducer or electrical input means 100 may be any conventional electrohydraulic transducer, such as a flapper nozzle valve controlled by a torque motor. The manual and/or electrical inputs are effective to move the linkage, members 20, 21, 102, and 106, so as to move control valve 110 longitudinally, and thereby cause the high pressure fluid to be directed into either chambers 72 or 73 adjacent to piston 71 of main actuator 70, to thereby cause movement of output arm 86. The overall operation of this servomotor will be best understood by reference to the following detailed description.

DETAILED DESCRIPTION AND OPERATION

The operation of this servomotor will be best understood from the following detailed description of the various components, and the method of operation thereof. As mentioned previously, the instant invention permits the use of a single servomotor which can be quickly and conveniently modified to serve either in a parallel operation or in a series operation. It should be noted that the servomotor is capable of operating in the straight manual mode or in the manual with power boost mode, whether it is modified for parallel operation or series operation. Stated another way, with the servomotor in its parallel configuration (FIG. 1), it is operable in one of three modes: straight manual mode, manual with power boost mode, and parallel autopilot mode (commonly referred to as the autopilot mode). With the servomotor in its series configuration (FIG. 3), it is operable in one of three modes: straight manual mode, manual with power boost mode, and series autopilot mode (commonly referred to as the damper mode).

PARALLEL OPERATION

Referring now to FIGURE 1, the servomotor is illustrated in its parallel configuration. There are three modes of operation to be considered, the first is the straight manual mode, the second is the manual with power boost mode, and the third is the parallel autopilot mode (autopilot mode). Each of these will be described in the order mentioned.

Manual Mode

The manual mode of operation can be defined as the operation of the aircraft control surface manually without power boost. In a situation where it is desired to operate in the manual mode, or in the event that there is a failure of hydraulic pressure, pressure is removed from input connection 11 so that there is no pressure in lines 30 and 52. In that event, spring 61 is effective to drive bypass valve 60 in an upward direction and thereby position input lock 26 in the upward position with rotary member 25 engaging the reduced diameter section 23 of member 20, thereby positioning and holding or latching or locking member 20 to body 10. At that time, annular groove 62 in bypass valve 60 is positioned so as to connect passage 64 to annular groove 36; thereby causing an unrestricted fluid passage extending from chamber 72, through passage 64 into annular chamber 62, through annular chamber 36, through chamber 68, and into annular chamber 73 on the opposite side of piston 71 of main actuator 70. Thereafter, a manual movement of member 20 causes the entire servomotor structure, other than main actuator 70, and thus output shaft 86, to be moved under the influence of the manual control member. It should be noted that main actuator 70, and hence, piston 71, are fixed to the aircraft 78 by means of coupling 74 and nut 75. Piston 71 does not restrict the movement of the servomotor housing 10 since there is an unrestricted flow of fluid across piston 71. Thus, piston 71 and main actuator 70 actually act as a supporting guide rod for the body 10, permitting it to move freely back and forth thereon under the influence of control movements introduced by the manual control member and member 20.

It should be noted that the anti-rotation arm 88 is pivotally connected by means of pins 87 and 89 between the aircraft 78 and extension 13 of main body 10. This anti-rotation arm eliminates the tendency of the servomotor to rotate about the axis of the main actuator 70. In addition, anti-rotation arm 88 acts as a support for the right end of the servomotor.

Manual With Power Boost Mode

To operate in the manual with power boost mode, a high pressure hydraulic fluid is received at inlet connection 11. The fluid is directed through passages 30 and 31 and into chamber 33 to thereby impinge on the upper side of piston 27 of input lock 26, thereby driving the input lock device 26 and the bypass valve 60 to the position shown in FIGURE 1 and holding the input lock 26 and bypass valve 60 in this position. The fluid is also directed from passage 30, through the annular chamber between lands 41 and 45 of plug 40, through passage 52, through the annular chamber adjacent to pin 51 of engage solenoid 50, and through passage 56 to annular chamber 116 located between lands 113 and 114 of control valve means 110. Thereafter, when a manual input is made to control the vehicle, for example, by moving member 20 to the right, links 21 and 106 are both rotated clockwise about their respective pivot points 76 and 98. These pins act as pivot points since the auxiliary actuator 90 is prevented from moving by the locking or holding or positioning mechanism 94-96. Link 102 is thereby moved to the left, being limited in this movement by shoulder 112 and the housing of transducer or electrical input means 100. Chamber 116 is then effective to connect high pressure passage 56 to passage 65, the fluid in passage 65 is then directed around the bypass valve 60 by way of annular chamber 36, into chamber 68 and then into the annular chamber 73 at the right of piston 71. Thus, movement of the manual control means connected to member 20 causes high pressure fluid to be directed against the main control piston 71 of main actuator 70, and since the main actuator 70 fixed to the aircraft 78 by means of coupling 74 and nut 75, body 10 and extension 13 are then moved to the right to thereby carry output shaft 86 to the right. As body 10 moves to the right, annular chamber 72 becomes smaller and the fluid therein is forced out of chamber 72 through fluid passage 77, into annular chamber 117, and then through return passages 58 and 54. In the event that member 20 is moved to the left, output shaft 86 is also moved to the left in an obvious manner under the influence of the hydraulic power boost arrangement just described.

During this manual with power boost mode of operation, bypass valve 60 is in the downward position, preventing any flow of fluid between annular chambers 62 and 36, so there is no direct fluid connection between annular chambers 72 and 73. It should be noted, however, that an excessive difference of pressure between chambers 72 and 73 is prevented by the overpower valves 66 and 67, thereby preventing any permanent damage of the servomotor. For example, should there be excessive pressure in chamber 72, the fluid in passage 64 then flows through annular chamber 62 and against valve 66, thereby compressing the spring of valve 66 and permitting the flow of fluid into chamber 68 and then to chamber 73, thereby reducing the pressure across piston 71. On the other hand, an excessive pressure in chamber 73, causes the spring of valve 67 to be compressed to the left, and the fluid then flows into chamber 62 and through passage 64 to chamber 72, to again reduce the pressure across piston 71.

It should also be noted that an annular chamber 63 is provided at the bottom of bypass valve 60 to collect any fluid that is forced past the valve, and this fluid is carried off to the return passage 54.

Parallel Autopilot Mode (Autopilot Mode)

When the servomotor is to be used in the parallel autopilot mode of operation, or as it is commonly known, the autopilot mode, it receives electrical input signals from the automatic flight control system and actuates the necessary control movements of the aircraft. It should be understood that normally, manual inputs cannot be introduced to the servomotor in the autopilot mode of operation and that only the electrical inputs control the control movements of the aircraft. It is possible to manually overpower the electrical (autopilot) inputs, if necessary, by exerting sufficient force on the manual control member to actuate the overpower valve 66 or 67, the operation of which was described hereinbefore. This reduces the pressure differential across piston 71 and allows the manual control member to position control valve means 110 and thus control the control movements of the aircraft.

When the parallel autopilot mode, or as it is commonly known, the autopilot mode, is desired, (FIGURE 1) engage solenoid 50 is energized, and pin 51 thereof is moved so as to block the connection between chamber 55 and return line 54, while opening a fluid passage between chamber 55 and pressure line 52. Pressure in chamber 55 is then directed through passage 53, through bore 44 of plug 40, and through passage 35 into chamber 34, thereby driving input lock 26 in an upward direction until rotary member 25 engages reduced diameter section 23 of shaft 20, to thereby latch or lock or hold member 20 in the centered position as shown. The pressure in chamber 34 is effective to move input lock 26 in an upward direction since it has a larger area to work against than has the pressure in chamber 33. At the same time, pressure is directed through passage 57, through timing orifice 107, to the opposite ends of chamber 108. The timing orifice 107, is used to assure that input lock 26 will have moved to the intended position before auxiliary actuator 90 is released. The pressure at the opposite ends of chamber 108 is then effective to force spring retaining members 94 and 96 toward each other, thereby compressing spring 95; the spring retaining members moving along the reduced diameter section 97 of auxiliary actuator 90. When the two spring retaining members, 94 and 96, are touching at the center of chamber 108, auxiliary actuator 90 is free to move within the limits necessary to achieve the desired operation of the servomotor. It will be understood that spring 95 is effective to lock or hold the auxiliary actuator 90 in the position shown, in the absence of any pressure being applied to opposite ends of chamber 108.

In the event that a movement of output shaft 86 to the left is now called for by the automatic flight control system, an electrical signal is transmitted to electrical input means or transducer 100, which operates as a pressure control valve in this parallel autopilot mode of operation. Electrical input means 100 is suitably energized so as to cause an increase in pressure in passage 103 which is directed against the left face of piston 91, to thereby drive piston 91 and auxiliary actuator 90 to the right and compress centering spring 93. The increase in pressure acting upon the area of the left face of piston 91 produces a force displacing piston 91 to the right until spring 93 exerts an equal and opposite force upon piston 91. At this point, piston 91 is fixed relative to housing 10. Consequently, spring 93 exerts a force upon piston 91 so as to prevent additional flow of fluid into the chamber on the left side of piston 91 from electrical input means 100. Spring 92 functions in a like manner when piston 91 is displaced to the left as viewed in FIGURE 1. The fluid in the chamber to the right of piston 91 is forced out of passage 104 to a return passage connection (not shown). It should be understood that the centering springs 92 and 93 are ineffective until the locking or holding or positioning mechanism 94–96 is disengaged, that is, until pressure is applied to the opposite ends of chamber 108 forcing spring retaining members 94 and 96 together as explained above. Movement of auxiliary actuator 90 to the right is then effective to move link 102 to the right, since pins 22 and 24 now act as pivot points; member 20 being fixed in position by input lock 26. The movement of link 102 to the right is limited by shoulder 111 and the housing of electrical input means 100. When sufficient movement to the right has occurred, control valve means 110 will have moved to a position whereby fluid in pressure line 56 flows into chamber 116, into passage 77, into annular chamber 72, and against the left face of piston 71; thereby driving body 10 to the left and carrying shaft 86 to the left. Fluid in annular chamber 73 is then discharged through chamber 68, annular chamber 36, passage 65, and then into return passage 58. Movement of output shaft 86 to the right occurs, in an obvious manner, when pressure is transmitted through line 104 to the right face of piston 91, causing piston 91 and auxiliary actuator 90 to move to the left.

Positional feedback is provided by potentiometer 80 comprising resistor 82 and wiper 81. Wiper 81 is fixed in position due to its secure attachment to main actuator 70 by connector 83, insulator means 99, and mounting screw 84. It should be noted that connector 83 is electrically insulated from actuator 70 by means of insulator means 99. Resistor 82 is mounted by suitable means (not shown) to body 10 of the servomotor, being thereby carried to the right as the body moves in that direction. Thus, with the center of resistor 82 effectively grounded, and the outer ends connected to potentials of opposite polarity, a signal is generated by potentiometer 80 that has a phase and magnitude proportional to the direction and extent of relative movement between wiper 81 and resistor 82. This feedback signal is effective to complete the servomechanism loop and null out the control signal after suitable movement of the output shaft 86 has been realized.

It is clear from the above description, that the control valve means 110 is operable as a resultant of the movement of the manual input member 20 and the auxiliary actuator 90, and the auxiliary actuator 90 is operable in response to signals from the electrical input or transducer means 100.

Since member 20 and body 10 are locked together during the parallel autopilot operation just described, it is apparent that a parallel servomotor operation has been shown whereby the movement of output shaft 86 and body 10 are transmitted through member 20 to the manual control device thereby causing a continuous stick feel. However, this servomotor is equally effective to function in a series operation.

SERIES OPERATION

The servomotor can be conveniently used in a series operation merely by: (1) substituting plug 40′ for the plug 40, (2) removing centering springs 92 and 93, and (3) picking the positional feedback signal from the auxiliary actuator 90 rather than from the main actuator 70. The servomotor is shown in the series configuration in FIGURE 3. In the series configuration, the servomotor is capable of operation in one of three modes of operation: straight manual mode, manual with power boost mode, and series autopilot mode (commonly referred to as the damper mode). The operation of the servomotor in the straight manual mode and in the manual with power boost mode while in the series configuration is identical to its operation in the parallel configuration which has been previously described. The series autopilot mode (damper mode) will now be described in detail.

*Series Autopilot Mode (Damper Mode)*

When the servomotor is to be used in the series autopilot mode of operation, or as it is commonly known the damper mode, it is used to introduce slight automatic corrections for control movements of the aircraft in addition to the main control that is achieved by the manual control member.

When the damper mode of operation is desired, engage solenoid 50 is energized, and pin 51 thereof is moved so as to block the connection between chamber 55 and return passage 54, while opening a fluid passage between chamber 55 and pressure line 52, in the same manner as in the parallel autopilot mode of operation previously described. However, when plug 40′ is substituted for plug 40, passage 53 is then blocked by land 41′ on plug 40′ and is not connected to fluid passage 35. Thus, the high pressure fluid is not directed to chamber 34 by passage 35 as in the parallel operation. On the contrary, fluid passage 35 is connected by means of bore 44′ to the return passage 32. Thus, during the series autopilot mode (damper mode) of operation, the input lock 26 and bypass valve 60 are held in the position shown in FIGURE 3 by the pressure in chamber 33. Therefore, body 10 can move independent of member 20. When engage solenoid 50 is energized, pressure also is directed through passage 57, through timing orifice 107, to the opposite ends of chamber 108. The pressure at the opposite ends of chamber 108 is then effective to force spring retaining members 94 and 96 of locking or holding or positioning mechanism 94–96 toward each other, thereby compressing spring 95, and moving the spring retaining members along the reduced diameter section 97 of auxiliary actuator 90. When the two spring retaining members 94 and 96 are touching at the center of chamber 108, auxiliary actuator 90 is free to move within the limits necessary to achieve the desired operation of the servomotor. During this series mode of operation, the damper signals are received in the electrical input means 100, which operates as a transfer valve. It should be noted that in this series autopilot mode of operation, the auxiliary actuator 90 has an integrating function to perform and consequently the centering springs 92 and 93 are not required. However, the hydraulic fluid in passages 103 and 104 impinging on either side of piston 91 tends to center the auxiliary actuator 90, in the absence of a damper signal, after locking mechanism 94–96 is disengaged.

As mentioned previously, in the series autopilot mode of operation, the main control of the aircraft is achieved by the manual control member and the automatic flight control system introduces slight corrections (damper signals) for control movements in addition to the manual control. In practice, both the manual and damper signals may occur simultaneously; however, for ease of understanding, the two signals will be described separately For manual input signals, member 20 will be moved, for example, to the right, whereby pins 76 and 98 will act as pivot points, and members 21 and 106 will rotate clockwise and link 102 is thereby moved to the left. It is limited in this movement by shoulder 112 and the housing of electrical input means 100. Pins 76 and 98 act as pivot points because auxiliary actuator 90 is maintained in the centered position by the action of the servo loop "tightness." That is to say, a slight displacement of the auxiliary actuator 90 causes a signal to be generated in potentiometer 80 which is fed to the electrical input means 100, which in turn causes fluid to flow into passage 103 or 104 and impinge piston 91 so as to oppose any displacement of auxiliary actuator 90 and tend to restore it to its centered position. As link 102 and control valve means 110 move to the left, high pressure fluid is directed to chamber 73 in the manner explained previously, causing movement of body 10 to the right to thereby carry output shaft 86 to the right. Mechanical feedback of the relative position of the main actuator 70 is provided by the linkage means, members 20, 21, 102, and 106, in cooperation with the moving servomotor housing 10.

In the event that a movement of shaft 86 to the left is now called for by the damper signals, electrical input means 100 is suitably energized so as to cause fluid to flow into passage 103 and against the left face of piston 91, to thereby drive piston 91 to the right. The fluid in the chamber to the right of piston 91 being then forced out of passage 104 to a return passage connection (not shown). Movement of auxiliary actuator 90 to the right is then effective to move link 102 to the right, and although member 20 is not locked to body 10, points 22 and 24 still act as pivot points since link 102 moves with relative ease as compared with the force that would be required to overcome the inertia of member 20 and the connected manual control device. Positional feedback from auxiliary actuator 90 of the auxiliary actuator is provided by a potentiometer 80 comprising resistor 82 and wiper 81. Resistor 80 is securely attached by suitable means (not shown) to the servomotor body 10, whereas wiper 81 is rigidly attached to auxiliary actuator 90 by means of connector 83' and insulator means 99', being thereby carried to the right as auxiliary actuator 90 moves in that direction. It should be noted that connector 83' is electrically insulated from actuator 90 by insulator means 99. Thus, with the center of resistor 82 effectively grounded, and the outer ends connected to potentials of opposite polarity, a signal is generated by potentiometer 80 that has a phase and magnitude proportional to the direction and extent of relative movement between wiper 81 and resistor 82. This feedback signal is effective to complete the servo loop and null out the damper signal to electrical input means 100 when suitable movement of auxiliary actuator 90 has been realized. The movement of link 102 to the right is limited by shoulder 111 and the body of electrical input means 100. When sufficient movement of link 102 to the right has occurred, pins 76 and 98 will have been repositioned due to movement of auxiliary actuator 90, and control valve means 110 will have moved to a position whereby fluid in pressure line 56 flows into chamber 116, passage 77, annular chamber 72, and against the left face of piston 71, thereby driving body 10 to the left and carrying shaft 86 to the left. Fluid in annular chamber 73 is then discharged through chamber 68, annular chamber 36, passage 65, and into return passage 58. Movement of output shaft 86 to the right occurs, in an obvious manner, when pressure is transmitted through line 104 to the right face of piston 91 causing piston 91 and shaft 90 to move to the left.

Thus, during the series autopilot mode (damper mode) of operation, both manual input signals and damper input signals control the relative movement of the servomotor housing 10 and hence the movement of output shaft 86. Stated another way, control valve means 110 is operable as a resultant of the movement of the manual input member 20 and the auxiliary actuator 90, and the auxiliary actuator 90 is operable in response to signals from the electrical input or transducer means 100. However, since manual input member 20 is free floating with respect to servomotor body 10, the damper signal inputs are not transmitted back to the manual input member and the minor corrections of the aircraft flight characteristics are achieved without causing a continuous "stick feel."

What has been described is considered to be the preferred embodiment of my invention, but it is apparent that numerous modifications thereof are possible and that the concepts involved are not necessarily limited to aircraft applications. Therefore, I do not wish to be limited to the form shown except as indicated by the following claims.

I claim:

1. In a hydraulic servomotor including a housing: a manual input means; means for positioning and latching said manual input means to said housing; an electrohydraulic transducer means; an auxiliary actuator; means for positioning and holding said auxiliary actuator relative to said housing; control valve means; and parallelogram linkage means connecting said manual input means, said auxiliary actuator, and said control valve means so that said control valve means is operable as a resultant of the movement of said manual input member and said auxiliary actuator; said auxiliary actuator being operable in response to signals from said electrohydraulic transducer means; a main actuator; said servomotor housing being positioned relative to said main actuator in response to signals from said control valve means to said main actuator; and feedback means, said feedback means being operable in response to the relative position of one of said actuators.

2. In an electrohydraulic servomotor including a housing: a manual input means; means for positioning and locking said manual input means to said housing; an electrical input means; an auxiliary actuator; spring actuated and pressure deactivated means for positioning and locking said auxiliary actuator relative to said housing; valve means; and parallelogram linkage means connecting said manual input means, said auxiliary actuator, and said valve means; said valve means being operable as a resultant of the movement of said linkage means; said auxiliary actuator being operable in response to signals from said electrical input means; a main actuator, said main actuator having an attaching portion; said servomotor housing being movable relative to said attaching portion in response to the operation of said valve means; and feedback means, said feedback means being operable in response to the position of one of said actuators.

3. In an electrohydraulic servomotor: a moveable servomotor housing; a manual input member; spring and pressure actuated means preventing relative movement between said manual input means and said housing means; an electrohydraulic transducer means; an auxiliary actuator; means for normally preventing movement of said auxiliary actuator relative to said housing; pressure actuated means for disengaging said auxiliary actuator movement preventing means; and means for centering said auxiliary actuator when said auxiliary actuator movement preventing means is disengaged, said auxiliary actuator being operable in response to signals from said electrohydraulic transducer means; valve means; parallelogram linkage means connecting said manual input means; said auxiliary actuator means, and said valve means; said valve means being operable in response to the resultant movement of said linkage means; a main actuator, said main actuator including an anchor member; said servomotor housing moving relative to said anchor member in response to signals from said valve means; and feedback means, said feedback means being operable in response to the relative position of said main actuator.

4. In a hydraulic servomotor: a moveable housing; a manual input means; spring and pressure actuated means for positioning and latching said manual input means relative to said housing; an electrical input means; an auxiliary actuator; spring actuated and pressure deactuated means for positioning and holding said auxiliary actuator relative to said housing; means for centering said auxiliary actuator, said centering means being operable after disengagement of said positioning and holding means, said auxiliary actuator being operable in response to signals from said electrical input means; control valve means; parallelogram linkage means connecting said manual input means, said auxiliary actuator means, and said control valve means, so that said control valve means is operable in response to the resultant movement of said linkage means; a main actuator; said main actuator including an attachment member; said servomotor housing moving relative to said main actuator attachment member in response to signals of said control valve means to said main actuator; and feedback means, said feedback means being operable in response to the position of said main actuator.

5. In an electrohydraulic servomotor: a moveable servomotor housing; a manual input means; spring actuated means preventing relative movement of said manual input means and said housing means; an electrohydraulic transducer means; an auxiliary actuator; and spring actuated and pressure deactuated means preventing relative movement of said auxiliary actuator and said housing, said auxiliary actuator being operable in response to signals from said electrohydraulic transducer means; valve means; parallelogram linkage means connecting said manual input means, said auxiliary actuator, and said valve means said valve means being operable in response to the resultant movement of said manual input means and said auxiliary actuator; a main actuator, one end of said main actuator being anchored to prevent movement thereof; said servomotor housing being operable in response to signals from said valve means; and feedback means, said feedback means being operable in response to the relative position of said auxiliary actuator.

6. In a hydraulic servomotor including a moveable housing: a manual input means; spring actuated means for positioning and latching said manual input means; an electrical input means; an auxiliary actuator; and means for positioning and holding said auxiliary actuator, said auxiliary actuator being operable in response to signals from said electrical input means; valve means, parallelogram linkage means connecting said manual input means, said auxiliary actuator, and said valve means, so that said valve means is operable in response to the resultant movement of said auxiliary actuator, a main actuator; said servomotor housing moving relative to said main actuator in response to the operation of said valve means; and feedback means, said feedback means being operable in response to the relative position of said auxiliary actuator.

References Cited in the file of this patent
UNITED STATES PATENTS

| | | |
|---|---|---|
| 2,898,889 | Foster | Aug. 11, 1959 |
| 2,943,606 | Willis et al. | July 5, 1960 |
| 2,947,285 | Baltus et al. | Aug. 2, 1960 |